US011245749B2

(12) United States Patent
Sawada et al.

(10) Patent No.: US 11,245,749 B2
(45) Date of Patent: Feb. 8, 2022

(54) VEHICLE INFORMATION COMMUNICATION SYSTEM AND ENVIRONMENT IMPROVEMENT SYSTEM, AND SERVER USED THEREIN

(71) Applicant: TOYOTA JIDOSHA KABUSHIKI KAISHA, Toyota (JP)

(72) Inventors: Hiroki Sawada, Toyota (JP); Masato Tamaoki, Iwakura (JP); Eisuke Ando, Nagoya (JP); Masato Endo, Nagakute (JP); Kuniaki Hasegawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 484 days.

(21) Appl. No.: 16/183,932

(22) Filed: Nov. 8, 2018

(65) Prior Publication Data

US 2019/0149598 A1 May 16, 2019

(30) Foreign Application Priority Data

Nov. 13, 2017 (JP) .............................. JP2017-218408

(51) Int. Cl.
*H04L 29/08* (2006.01)
*H04W 4/46* (2018.01)
(Continued)

(52) U.S. Cl.
CPC .......... *H04L 67/1008* (2013.01); *B01D 46/02* (2013.01); *B01D 46/442* (2013.01);
(Continued)

(58) Field of Classification Search
CPC . H04L 67/1008; H04L 63/0876; H04L 67/12; H04W 4/38; H04W 4/46;
(Continued)

(56) References Cited

U.S. PATENT DOCUMENTS 9,375,847 B2 * 6/2016 Angle .................. G05D 1/0022
2014/0379127 A1 12/2014 Tsuboi et al.
(Continued)

FOREIGN PATENT DOCUMENTS

CN 103763334 A 4/2014
CN 107396291 A 11/2017
(Continued)

OTHER PUBLICATIONS

The Future Traffic and Block Chain, Monthly KOTI Magazine on Transport, The Korea Transport Institute, 2017, vol. 10, pp. 42-45.
(Continued)

*Primary Examiner* — Navid Ziaeianmehdizadeh
(74) *Attorney, Agent, or Firm* — Hunton Andrews Kurth LLP

(57) ABSTRACT

A vehicle information communication system includes: a plurality of vehicles; and a server configured to communicate with the plurality of vehicles. The server is configured to perform communication by using either a first communication mode or a second communication mode. In the first communication mode, the server receives and transmits information to and from each of the plurality of vehicles individually. In the second communication mode, the server receives and transmits the information to and from a part of the plurality of vehicles and the information is shared among the plurality of vehicles by using vehicle-to-vehicle communication.

8 Claims, 12 Drawing Sheets

(51) Int. Cl.
| | |
|---|---|
| *H04W 4/44* | (2018.01) |
| *G05D 1/00* | (2006.01) |
| *G05D 1/02* | (2020.01) |
| *G01C 21/34* | (2006.01) |
| *B01D 46/44* | (2006.01) |
| *B01D 46/02* | (2006.01) |
| *B01D 46/46* | (2006.01) |
| *H04L 29/06* | (2006.01) |
| *H04W 76/14* | (2018.01) |
| *G08G 1/01* | (2006.01) |
| *H04W 40/34* | (2009.01) |
| *H04W 4/38* | (2018.01) |
| *H04W 40/22* | (2009.01) |
| *G08G 1/00* | (2006.01) |

(52) U.S. Cl.
CPC .......... *B01D 46/46* (2013.01); *G01C 21/343* (2013.01); *G05D 1/0027* (2013.01); *G05D 1/0297* (2013.01); *G08G 1/0112* (2013.01); *G08G 1/0133* (2013.01); *H04L 63/0876* (2013.01); *H04L 67/12* (2013.01); *H04W 4/38* (2018.02); *H04W 4/44* (2018.02); *H04W 4/46* (2018.02); *H04W 40/22* (2013.01); *H04W 40/34* (2013.01); *H04W 76/14* (2018.02); *B01D 2279/40* (2013.01); *G05D 2201/0203* (2013.01); *G08G 1/202* (2013.01); *H04L 2209/38* (2013.01)

(58) Field of Classification Search
CPC ....... H04W 4/44; H04W 76/14; H04W 40/22; H04W 40/34; B01D 46/02; B01D 46/442; B01D 46/46; B01D 2279/40; G01C 21/343; G05D 1/0027; G05D 1/0297; G05D 2201/0203; G08G 1/0112; G08G 1/0133; G08G 1/202
See application file for complete search history.

(56) References Cited

U.S. PATENT DOCUMENTS

| | | | |
|---|---|---|---|
| 2017/0109704 | A1 | 4/2017 | Lettieri et al. |
| 2017/0215123 | A1 | 7/2017 | d'Orey et al. |
| 2017/0261979 | A1* | 9/2017 | Km .................. G05D 1/0011 |
| 2017/0353777 | A1* | 12/2017 | Mach .................... G08B 21/12 |
| 2020/0122595 | A1* | 4/2020 | Nonnenmacher ........................... G06Q 10/06315 |

FOREIGN PATENT DOCUMENTS

| | | |
|---|---|---|
| EP | 3376456 A1 | 9/2018 |
| JP | 2009-276991 A | 11/2009 |
| JP | 2013146310 A | 8/2013 |
| JP | 2017044408 A | 3/2017 |
| JP | 2017-091149 A | 5/2017 |
| JP | 2017-123692 A | 7/2017 |
| KR | 20090000773 A | 1/2009 |
| KR | 20100036505 A | 4/2010 |
| WO | 2009018835 A1 | 2/2009 |
| WO | 2016015764 A1 | 2/2016 |
| WO | 2016/133320 A1 | 8/2016 |
| WO | 2017/149280 A1 | 9/2017 |
| WO | 2017180382 A1 | 10/2017 |

OTHER PUBLICATIONS

Yuan, Y, et al. Towards Blockchain-based Intelligent Transportation Systems, (Nov. 1-4, 2016), pp. 2663-2668. 2016 IEEE 19th International Conference on Intelligent Transportation Systems (ITSC) Windsor Oceanico Hotel, Rio de Janeiro, Brazil, 6 pages.
Bazzi, A., et al., "Taking Advantage of V2V Communications for Traffic Management", IEEE Intelligent Vehicles Symposium (IV), Germany, Jun. 9, 2011, 6 pages.
Lin, S.-H., et al., "A Novel Social Clusterbased P2P Framework for Integrating VANETs with the Internet", IEEE Wireless Communications and Networking Conference, Apr. 8, 2009, 6 pages.

* cited by examiner

<MODE I>

⟨MODE II⟩

FIG.6

| VEHICLE ID | DATE | VEHICLE POSITION | DETECTED CONCENTRATION (ppm) | AVAILABLE TIME PERIOD | POSSIBILITY OF MOVEMENT |
|---|---|---|---|---|---|
| A1234 | 2017/10/20 10:10:20 | (X1, Y1, Z1) | 10 | 10:00-14:00 | POSSIBLE |
| A2345 | 2017/10/20 10:05:30 | (X2, Y2, Z2) | 20 | 17:00-24:00 | IMPOSSIBLE |
| B3456 | 2017/10/20 10:00:40 | (X3, Y3, Z3) | 100 | 08:00-15:00 | POSSIBLE |
| C4567 | 2017/10/20 10:12:35 | (X4, Y4, Z4) | 5 | 12:00-15:00 | POSSIBLE |
| D5678 | 2017/10/20 10:09:00 | (X5, Y5, Z5) | 60 | 06:00-10:00 | POSSIBLE |

FIG.8

| AREA | POLLUTION LEVEL (ppm) | NECESSITY OF IMPROVEMENT | SELECTED VEHICLE ID |
|---|---|---|---|
| A | 10 | UNNECESSARY | |
| B | 300 | NECESSARY | A1234, D5123, F8546, G5564 |
| C | 20 | UNNECESSARY | |
| D | 180 | NECESSARY | B2344, C8542, E4621 |
| E | 200 | NECESSARY | A6582, M4522, F1223 |
| F | 50 | UNNECESSARY | |
| G | 150 | NECESSARY | C1597, D5547, H2541 |
| H | 30 | UNNECESSARY | |

FIG.9

<MODE I>

| VEHICLE ID | AREA | MOVEMENT POSITION | OPERATION MANNER |
|---|---|---|---|
| A1234 | A | (X6, Y6, Z6) | STOP |
| D5123 | A | (X7, Y7, Z7) | TRAVEL |
| F8546 | A | (X8, Y8, Z8) | TRAVEL |
| G5564 | A | (X9, Y9, Z9) | TRAVEL |
| B2344 | D | (X10, Y10, Z10) | STOP |
| C8542 | D | (X11, Y11, Z11) | TRAVEL |
| C1597 | G | (X16, Y16, Z16) | TRAVEL |
| D5547 | G | (X17, Y17, Z17) | TRAVEL |
| H2541 | G | (X18, Y18, Z18) | TRAVEL |

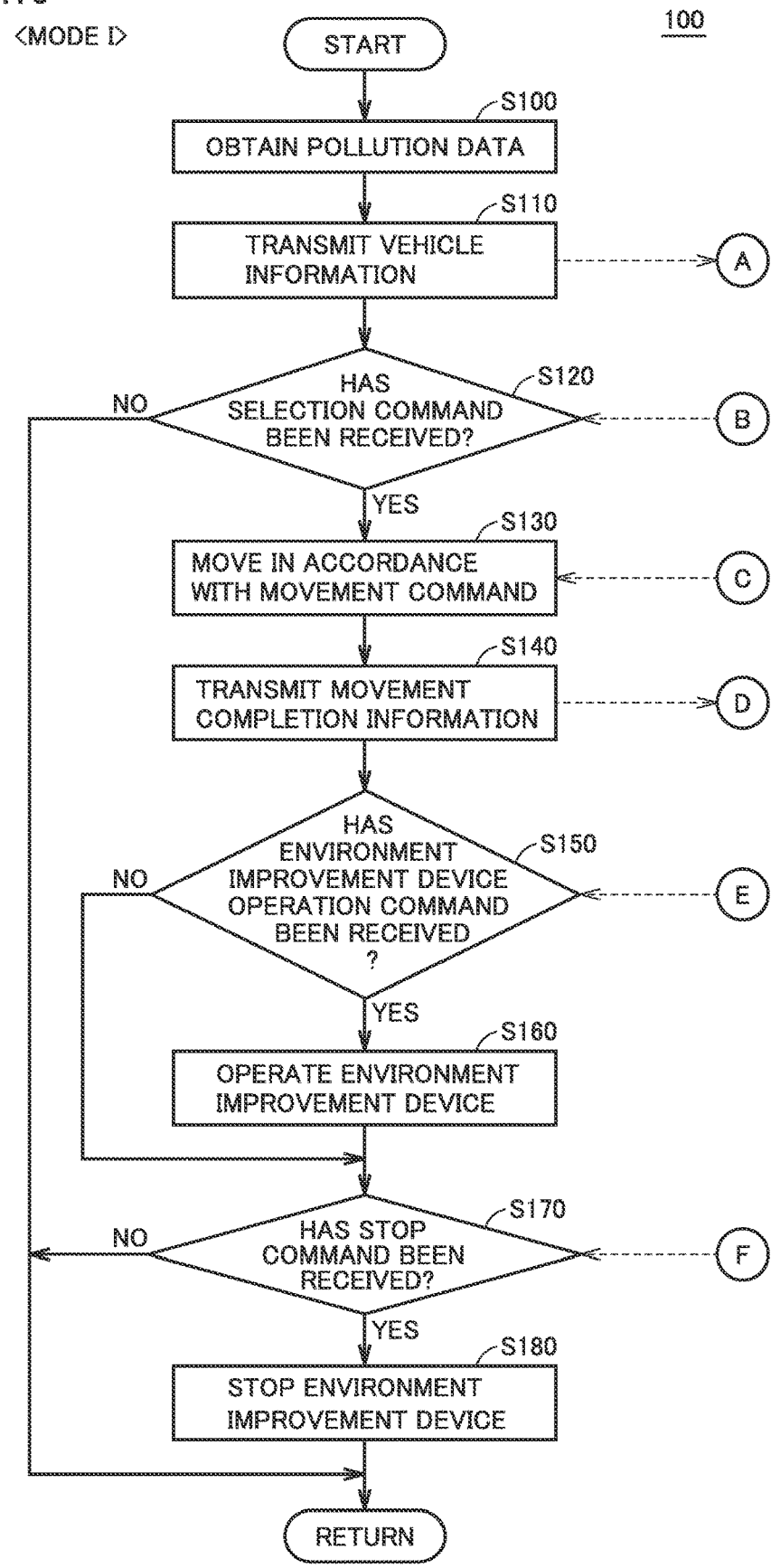

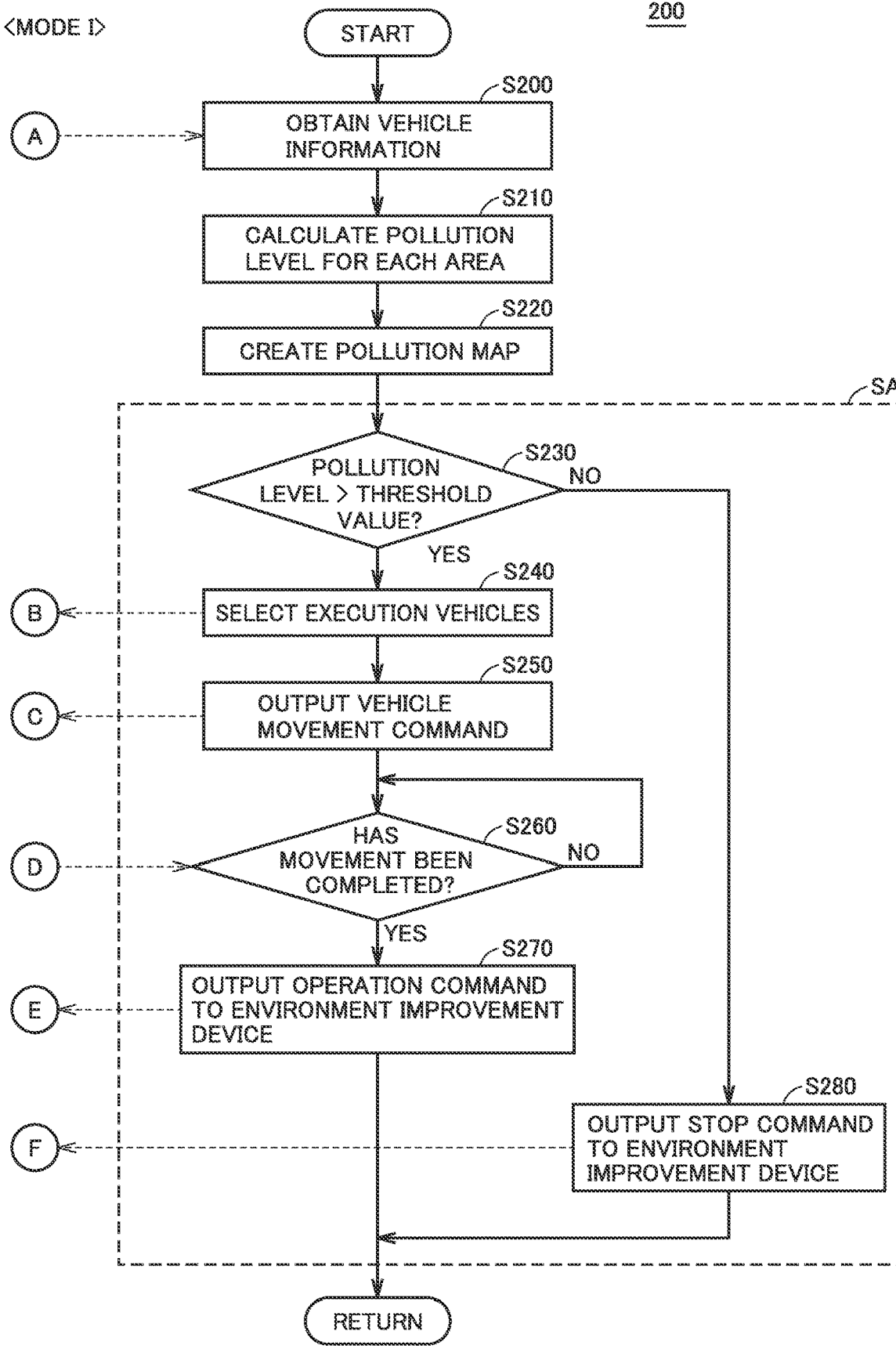

FIG.12

<MODE II>

| VEHICLE ID | AREA | MOVEMENT POSITION | OPERATION MANNER | REPRESENTATIVE |
|---|---|---|---|---|
| A1234 | A | (X6, Y6, Z6) | STOP | ○ |
| D5123 | A | (X7, Y7, Z7) | TRAVEL | — |
| F8546 | A | (X8, Y8, Z8) | TRAVEL | — |
| G5564 | A | (X9, Y9, Z9) | TRAVEL | — |

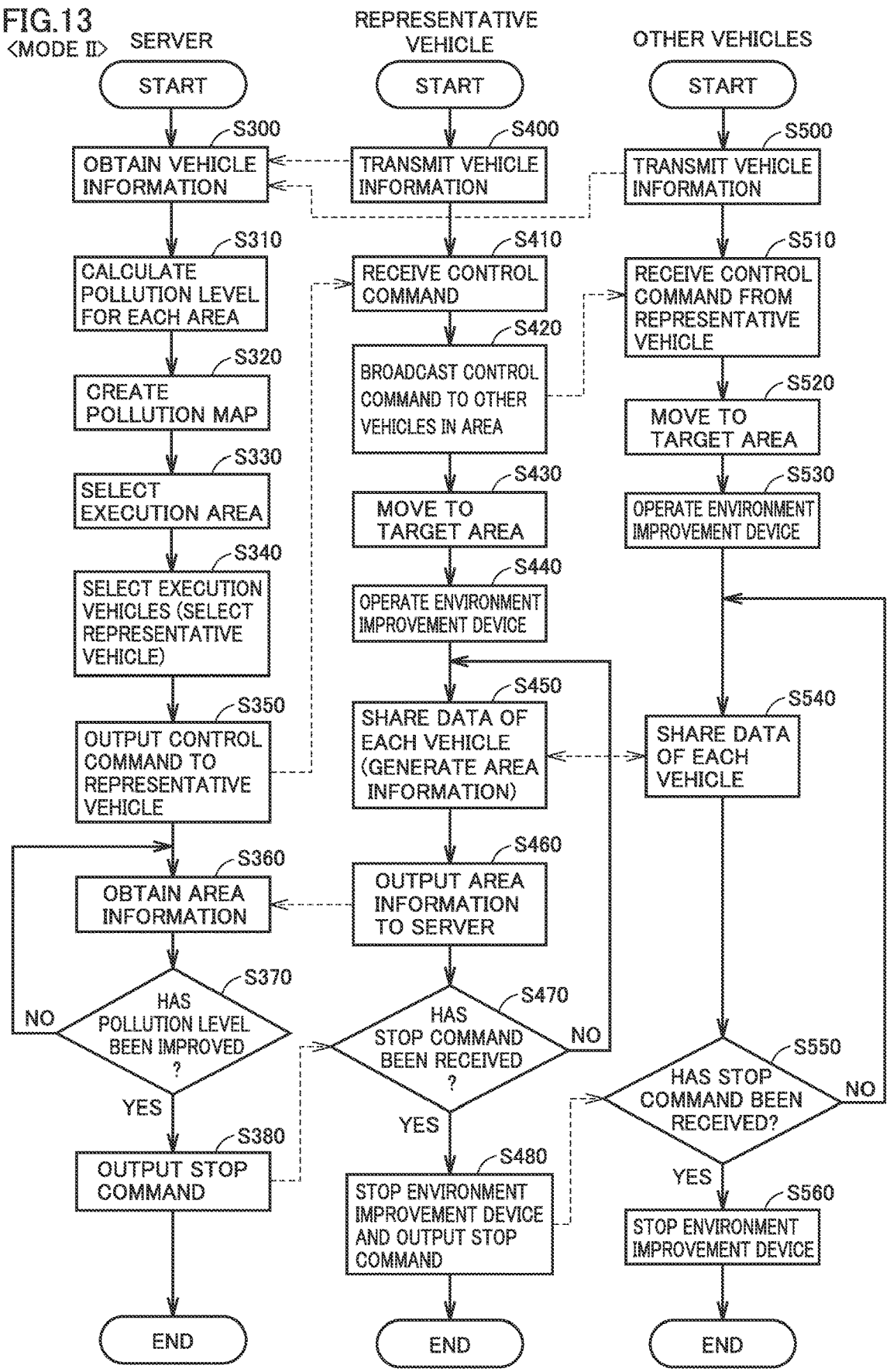

VEHICLE INFORMATION COMMUNICATION SYSTEM AND ENVIRONMENT IMPROVEMENT SYSTEM, AND SERVER USED THEREIN

This nonprovisional application is based on Japanese Patent Application No. 2017-218408 filed on Nov. 13, 2017 with the Japan Patent Office, the entire contents of which are hereby incorporated by reference.

BACKGROUND

Field

The present disclosure relates to a vehicle information communication system and an environment improvement system, and a server used therein. More particularly, the present disclosure relates to the technique of performing communication by switching a communication mode between a server and vehicles.

Description of the Background Art

Japanese Patent Laying-Open No. 2009-276991 discloses a risk avoidance system for avoiding risk in a vehicle group level. In the risk avoidance system disclosed in Japanese Patent Laying-Open No. 2009-276991, upon receiving information that a risk of collision with a following vehicle (third vehicle) has been detected from a vehicle (first vehicle), a traffic information management server provides the first vehicle and a vehicle (second vehicle) therearound with a command to execute coordinated travel control, thereby avoiding a collision between the first vehicle and the third vehicle and a collision between the first vehicle and the second vehicle.

SUMMARY

In the system disclosed in Japanese Patent Laying-Open No. 2009-276991, the server provides comprehensive control of a plurality of vehicles, and thus, the safety in a vehicle group level can be improved. However, the server executes the entire control, and thus, when the number of vehicles to be controlled increases, a load on the server increases, which may cause a reduction in control speed and the like.

On the other hand, use of a blockchain disclosed in Japanese Patent Laying-Open No. 2017-123692 and Japanese Patent Laying-Open No. 2017-091149 has been proposed as a method for managing data in a distributed manner.

The present disclosure has been made to solve the above-described problem, and an object of the present disclosure is to provide a vehicle information communication system configured to perform communication between a plurality of vehicles and a server, in which an increase in load on the server is suppressed and appropriate communication is performed.

A vehicle information communication system according to the present disclosure includes: a plurality of vehicles; and a server configured to communicate with the plurality of vehicles. The server communicates with the plurality of vehicles by using either a first communication mode or a second communication mode. In the first communication mode, the server receives and transmits information to and from each of the plurality of vehicles individually. In the second communication mode, the server receives and transmits the information to and from a part of the plurality of vehicles and the information is shared among the plurality of vehicles by using vehicle-to-vehicle communication.

According to the present disclosure, in the system configured to perform communication between the plurality of vehicles and the server, the communication mode can be switched between the first communication mode and the second communication mode. In the first communication mode, communication is performed individually between each vehicle and the server. In the second communication mode, communication is distributed and performed between the server and only a part of the vehicles and the information is shared among the vehicles by using vehicle-to-vehicle communication. In the first communication mode, the information can be obtained in real time. However, a load on the server side increases when the number of vehicles with which the server communicates increases. By appropriately switching between the two communication modes, an increase in communication load on the server can be suppressed and appropriate communication can be performed.

The server performs communication in the first communication mode when a communication load between the server and the plurality of vehicles is lower than a threshold value, and performs communication in the second communication mode when the communication load is higher than the threshold value.

With such a configuration, the information can be obtained in real time by using the first communication mode when the communication load between the server and the vehicles is low, and an increase in load can be suppressed by distributed communication when the communication load is high.

In the second communication mode, the plurality of vehicles share the information by using blockchain authentication.

By sharing the information using blockchain authentication, the reliability and robustness of data shared among the vehicles can be ensured.

An environment improvement system according to another aspect of the present disclosure includes: a sensor configured to detect a state of pollution by an environmental pollutant; a plurality of vehicles on each of which an environment improvement device configured to remove the environmental pollutant is mounted; and a server configured to communicate with the plurality of vehicles. The server communicates with the plurality of vehicles by using either a first communication mode or a second communication mode. In the first communication mode, the server receives and transmits information to and from each of the plurality of vehicles individually. In the second communication mode, the server receives and transmits the information to and from a part of the plurality of vehicles and the information is shared among the plurality of vehicles by using vehicle-to-vehicle communication. When a pollution level by the environmental pollutant exceeds a reference value in an area where the sensor is located, the server causes a vehicle selected from the plurality of vehicles to move to the area, and outputs a command to execute an environment improvement operation using the environment improvement device.

By switching the communication mode between the first communication mode and the second communication mode and performing communication in the environment improvement system configured to improve the state of environmental pollution in the area by using the plurality of vehicles on each of which the environment improvement device is mounted, an increase in communication load between the server and the vehicles can be suppressed and appropriate communication can be performed.

The server performs communication in the first communication mode when the number of vehicles selected to execute the environment improvement operation is smaller than the reference number, and performs communication in the second communication mode when the number is larger than the reference number.

With such a configuration, the information can be obtained in real time by using the first communication mode when the number of target vehicles is small and the communication load between the server and the vehicles is low, and an increase in load can be suppressed by distributed communication when the number of target vehicles is large and the communication load is high.

The sensor is provided in each of the plurality of vehicles.

When the pollution level is determined based only on information from a fixed sensor, environment improvement in the entire area may be impossible if the state of pollution in the area is not uniform. By using the sensors mounted on the movable vehicles, the state of pollution can be detected in a wider range in the area. Thus, the state of environmental pollution can be appropriately improved in the entire area.

The server calculates the pollution level for each predetermined area, using position information of the plurality of vehicles and information about the state of pollution detected by the sensor.

With such a configuration, the position information of the moving vehicles and the state of pollution can be associated with each other and the pollution level can be calculated, and thus, the state of environmental pollution in the area can be detected more appropriately.

When the server performs communication in the second communication mode, the server determines, for each area, a representative vehicle for communicating with the server. During communication in the second communication mode, the representative vehicle transmits the information from the server to the other vehicles in the area by vehicle-to-vehicle communication, and transmits the information shared among the vehicles in the area to the server.

The information from the server is transmitted to each vehicle via the representative vehicle and the information shared among the vehicles is also transmitted to the server by the representative vehicle. Since the representative vehicle provides comprehensive control of the group of vehicles as described above, an increase in communication load between the vehicles and the server can be suppressed and appropriate communication can be performed.

A server according to still another aspect of the present disclosure is configured to communicate with a plurality of vehicles. The server communicates with the plurality of vehicles by using either a first communication mode or a second communication mode. The first communication mode is a communication mode in which the server receives and transmits information to and from each of the plurality of vehicles individually. The second communication mode is a communication mode in which the server receives and transmits the information to and from a part of the plurality of vehicles and the information is shared among the plurality of vehicles by using vehicle-to-vehicle communication.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 shows one example of contents of vehicle information transmitted from the vehicle to the server.

FIG. 8 shows one example of determination of necessity of environment improvement, and vehicle selection that are executed by the server.

FIG. 9 shows one example of contents of a control command provided from the server to the vehicle in the first communication mode.

FIG. 10 is a flowchart for illustrating a detailed process of control executed in the vehicle in the first communication mode.

FIG. 11 is a flowchart for illustrating a detailed process of control executed in the server in the first communication mode.

FIG. 12 shows one example of contents of a control command provided from the server to the vehicle in the second communication mode.

FIG. 13 is a flowchart for illustrating a detailed process of control executed in the server and the vehicle in the second communication mode.

DESCRIPTION OF THE PREFERRED EMBODIMENTS

Figure 1:
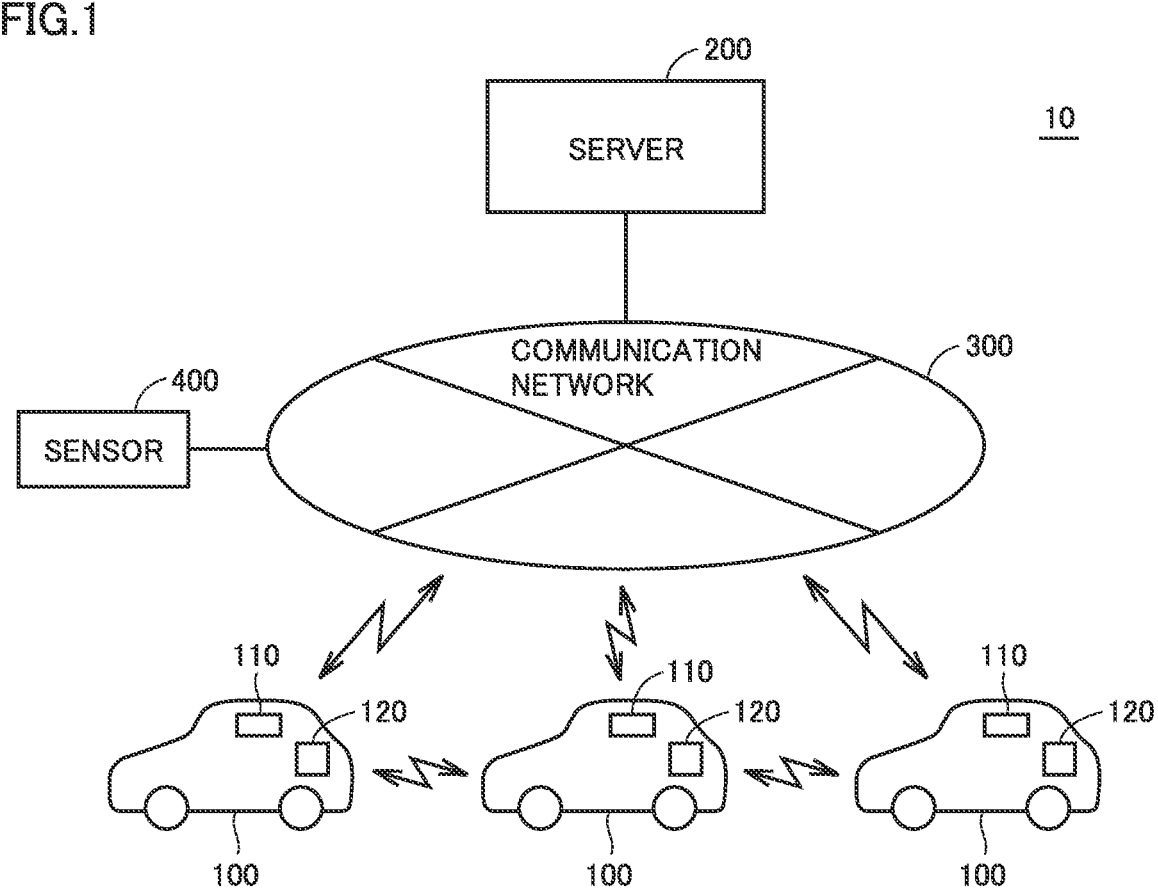
FIG. 1 is a schematic diagram of an overall configuration of a vehicle information communication system (environment improvement system) according to the present embodiment.

An embodiment of the present disclosure will be described in detail hereinafter with reference to the drawings, in which the same or corresponding portions are denoted by the same reference characters and description thereof will not be repeated.

(Overview of System)

FIG. 1 is a schematic diagram of an overall configuration of a vehicle information communication system 10 according to the present embodiment.

Referring to FIG. 1, vehicle information communication system 10 includes a plurality of vehicles (hereinafter also simply referred to as "vehicles") 100, and a server 200 configured to communicate with vehicles 100, and information is exchanged between server 200 and vehicles 100.

In the present embodiment, the case of an environment improvement system configured to remove an environmental pollutant in a target area by using a plurality of vehicles each having an environment improvement device mounted thereon will be described as a specific example of vehicle information communication system 10. In the following description, vehicle information communication system 10 may also be referred to as "environment improvement system 10". The vehicle information communication system according to the present embodiment is not limited to the environment improvement system described below, as long as information is exchanged between server 200 and the plurality of vehicles 100.

Vehicles 100 and server 200 are configured to mutually exchange information via a communication network 300 such as, for example, the Internet or a telephone line. Vehicles 100 and server 200 may directly communicate with each other without communication network 300. Direct communication between vehicles 100 is also possible.

Vehicle 100 is an electrically-powered vehicle that can travel using the electric power provided from a battery mounted thereon. Examples of the electrically-powered vehicle include an electric vehicle, a hybrid vehicle, a fuel cell vehicle and the like. A vehicle that travels using only the driving force generated in an internal combustion engine can also be used as vehicle 100. However, in the present embodiment, an electrically-powered vehicle with a relatively small amount of release of an air pollutant (hereinafter also referred to as "environmental pollutant") is preferably used from the perspective of environment improvement.

Vehicle 100 includes a sensor unit 110 configured to detect a concentration of a particulate matter such as pollen or PM2.5 or a gaseous air pollutant such as sulfur oxide (SOx) or nitrogen oxide (NOx). Vehicle 100 also includes an environment improvement device 120 such as an air cleaner or a bag filter configured to remove the air pollutant.

Server 200 obtains, through communication network 300, the concentration of the environmental pollutant detected by sensor unit 110 mounted on vehicle 100 or a sensor 400 fixed on the roadside or the like, and calculates a pollution level in a prescribed area. When the calculated pollution level becomes worse and exceeds a prescribed threshold value, server 200 causes vehicles 100 located in the area or in an area close thereto to move to within the area, and to operate environment improvement devices 120 mounted on vehicles 100. As a result, the environmental pollutant in the area having a high pollution level is removed and the environment is improved.

(Configuration of Vehicle and Server)

Figure 2:
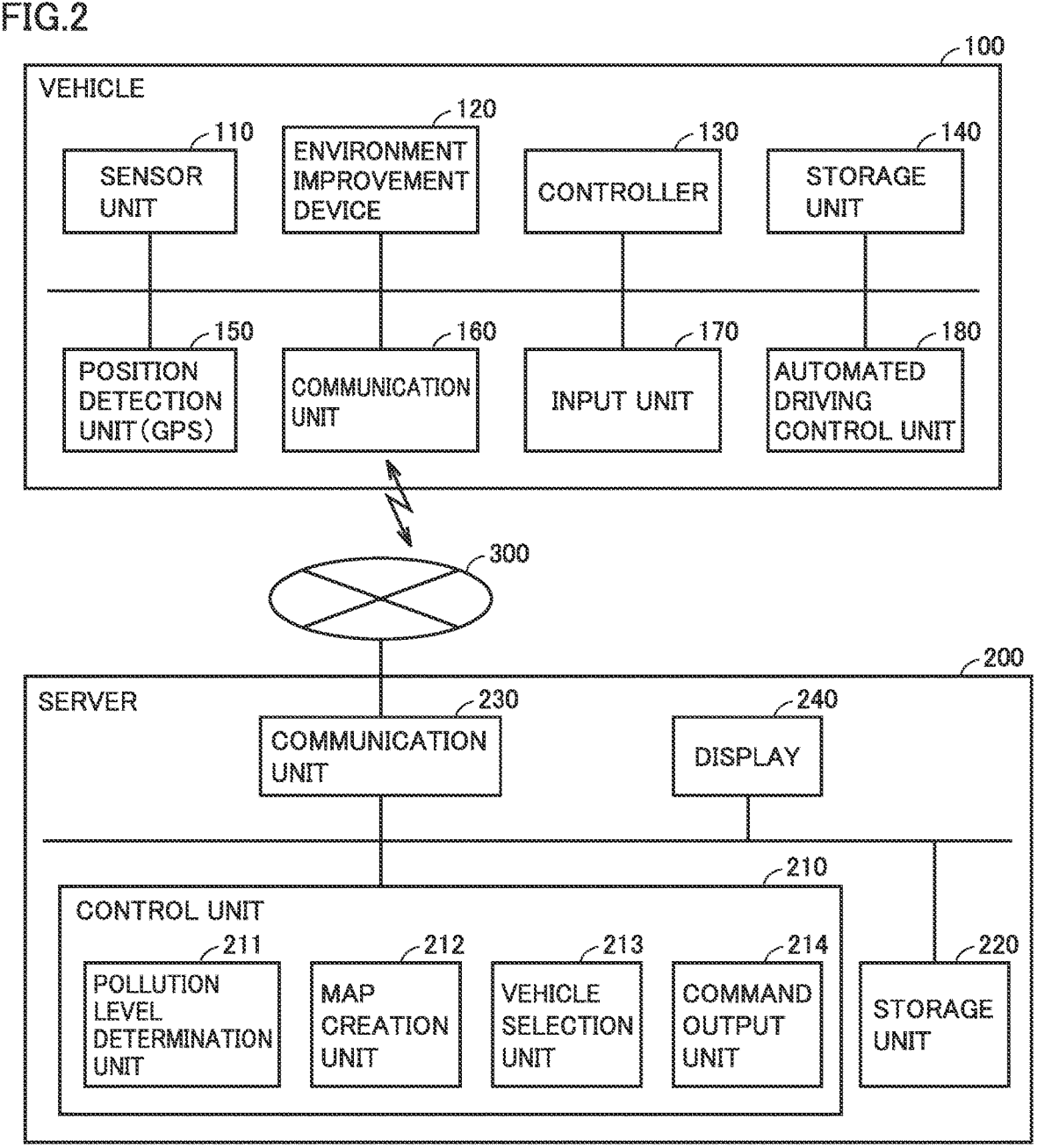
FIG. 2 is a block diagram for illustrating details of a vehicle and a server in FIG. 1.

FIG. 2 is a block diagram for illustrating details of vehicle 100 and server 200 in FIG. 1. Referring to FIG. 2, in addition to sensor unit 110 configured to detect the environmental pollutant and environment improvement device 120 configured to remove the environmental pollutant, vehicle 100 further includes a controller 130, a storage unit 140, a position detection unit 150, a communication unit 160, an input unit 170, and an automated driving control unit 180.

Communication unit 160 is a communication interface between vehicle 100 and communication network 300. Vehicle 100 performs wireless communication with communication network 300 via communication unit 160, and receives and transmits information to and from server 200. Vehicle 100 can also perform vehicle-to-vehicle communication with another vehicle via communication unit 160.

Although not shown, controller 130 includes a CPU (Central Processing Unit), a storage device such as a memory, and an input/output buffer, and provides comprehensive control of vehicle 100. Controller 130 receives a command from server 200 via communication unit 160. Upon receiving a command to move vehicle 100 from server 200, controller 130 causes automated driving control unit 180 to execute automated driving of vehicle 100, thereby moving vehicle 100 to a position specified by server 200. Controller 130 also controls start or stop of environment improvement device 120 based on a command from server 200.

Storage unit 140 is configured to include a recording device such as, for example, a nonvolatile memory or an HDD (Hard Disc Drive). Storage unit 140 stores a command received from server 200, and stores a parameter and the like set by a user.

Position detection unit 150 is included in, for example, a navigation device (not shown), and obtains absolute position information of vehicle 100 itself by using the GPS (Global Positioning System). Position detection unit 150 outputs the obtained position information to server 200.

Input unit 170 is formed by a touch panel, a switch or the like, and is included in, for example, the above-described navigation device. The user can set the parameter and the like by operating input unit 170.

Server 200 includes a control unit 210, a storage unit 220, a communication unit 230, and a display 240. Control unit 210 includes a pollution level determination unit 211, a map creation unit 212, a vehicle selection unit 213, and a command output unit 214.

Communication unit 230 is a communication interface between server 200 and communication network 300. Server 200 obtains vehicle information from vehicle 100 via communication unit 230, and outputs the movement command and the command to operate environment improvement device 120 to vehicle 100.

Storage unit 220 stores contents of the vehicle information received via communication unit 230. Storage unit 220 also prestores map information of a region where the environment improvement operation is to be executed.

Pollution level determination unit 211 included in control unit 210 calculates a pollution level for each predetermined area, using the concentration of the environmental pollutant included in the vehicle information transmitted from each vehicle 100, and determines necessity of the environment improvement operation. Map creation unit 212 associates the pollution level calculated by pollution level determination unit 211 with the map information stored in storage unit 220, and creates a pollution map. The created pollution map is displayed on display 240 such as a liquid crystal display panel, and thus, a server administrator and the like can visually recognize a state of environmental pollution.

For a target area determined as the environment improvement operation being necessary, vehicle selection unit 213 selects vehicles for executing the environment improvement operation in the target area, from vehicles 100 located in the target area or in an area close thereto. Command output unit 214 generates a command to execute the environment improvement operation, and outputs the command to selected vehicles 100.

In the present embodiment, as described above, the state of pollution by the environmental pollutant is detected for each area based on the information obtained from the sensor mounted on the vehicle or the fixed sensor, and the vehicles having the environment improvement devices mounted thereon are moved to the area having a high pollution level, thereby removing the environmental pollutant. With such a configuration, the pollution level in the area can be reduced and the state of environmental pollution can be improved.

In the system in which communication is performed between server 200 and the plurality of vehicles 100, like environment improvement system 10 according to the present embodiment, if the number of vehicles 100 communicating with server 200 is relatively small, server 200 can execute appropriate control even when server 200 communicates with each vehicle 100 individually. However, if a range of a region covered by server 200 becomes wider and the number of vehicles 100 to be controlled increases, a load on server 200 increases, which may cause a reduction in control speed and the like.

Thus, in the present embodiment, a method for suppressing an increase in load on server 200 by using different communication modes depending on a communication load between server 200 and vehicles 100 is adopted. Two communication modes in the present embodiment will be described below with reference to FIGS. 3 and 4.

(Description of Communication Modes)

Figure 3:
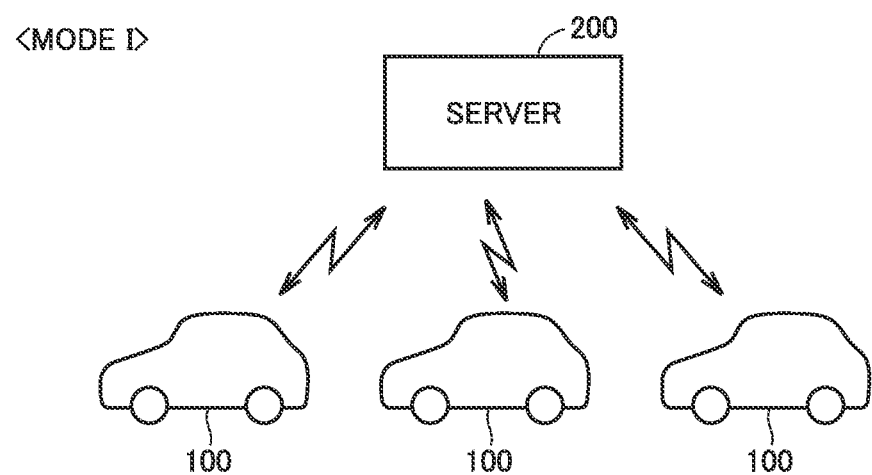
FIG. 3 is a diagram for illustrating an overview of communication in a first communication mode.

FIG. 3 is a diagram for illustrating an overview of communication in a first communication mode (hereinafter also referred to as "mode I"), which is used when the number of vehicles 100 to be controlled is relatively small (i.e., when the load on server 200 is low). Referring to FIG. 3, in mode I, server 200 communicates with each vehicle 100 individually. In mode I, server 200 directly obtains information from each vehicle 100, and thus, mode I has the advantage that server 200 can monitor the entire system in real time.

Figure 4:
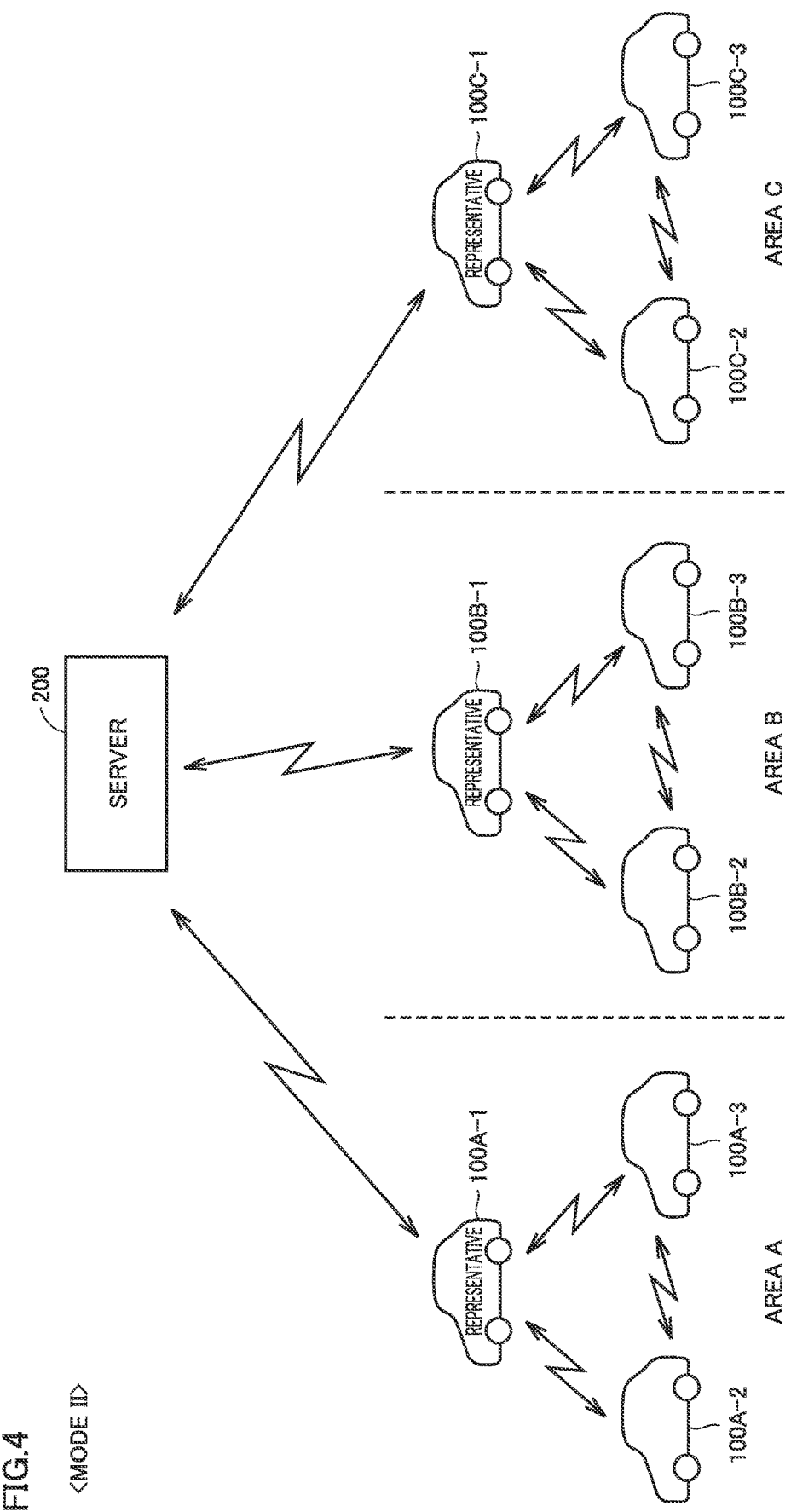
FIG. 4 is a diagram for illustrating an overview of communication in a second communication mode.

FIG. 4 is a diagram for illustrating an overview of communication in a second communication mode (hereinafter also referred to as "mode II"), which is used when the number of vehicles 100 to be controlled is large (i.e., when the load on server 200 is high). In mode II, server 200 communicates with only a part (hereinafter also referred to as "representative vehicle") of the plurality of vehicles 100, and the other vehicles obtain information from server 200 by vehicle-to-vehicle communication with the representative vehicle.

In the example of environment improvement system 10 according to the present embodiment, the representative vehicle is set for each area where the pollution level is determined. For example, as in FIG. 4, a vehicle 100A-1 is selected as a representative vehicle in an area A, a vehicle 100B-1 is selected as a representative vehicle in an area B, and a vehicle 100C-1 is selected as a representative vehicle in an area C.

In area A, the vehicles (vehicles 100A-2 and 100A-3) other than representative vehicle 100A-1 obtain a command from server 200 by vehicle-to-vehicle communication with representative vehicle 100A-1. In addition, the operation condition (vehicle information) of the vehicles in the same area is shared among the vehicles and the vehicle information of the vehicles in the area is collectively transmitted to server 200 by representative vehicle 100A-1. Sharing of the information by vehicle-to-vehicle communication in the area is implemented using blockchain authentication.

Similarly, in areas B and C as well, representative vehicles 100B-1 and 100C-1 communicate with server 200, and the information is shared among the other vehicles by vehicle-to-vehicle communication in the respective areas.

By performing communication in mode II as described above, only representative vehicles 100A-1, 100B-1 and 100C-1 communicate with server 200, and thus, the load on server 200 can be reduced as compared with the case of individually communicating with each vehicle. However, in mode II, monitoring of the operation condition of each vehicle in real time is difficult due to distributed communication caused by the hierarchical structure.

(Description of Contents of Control)

Figure 5:
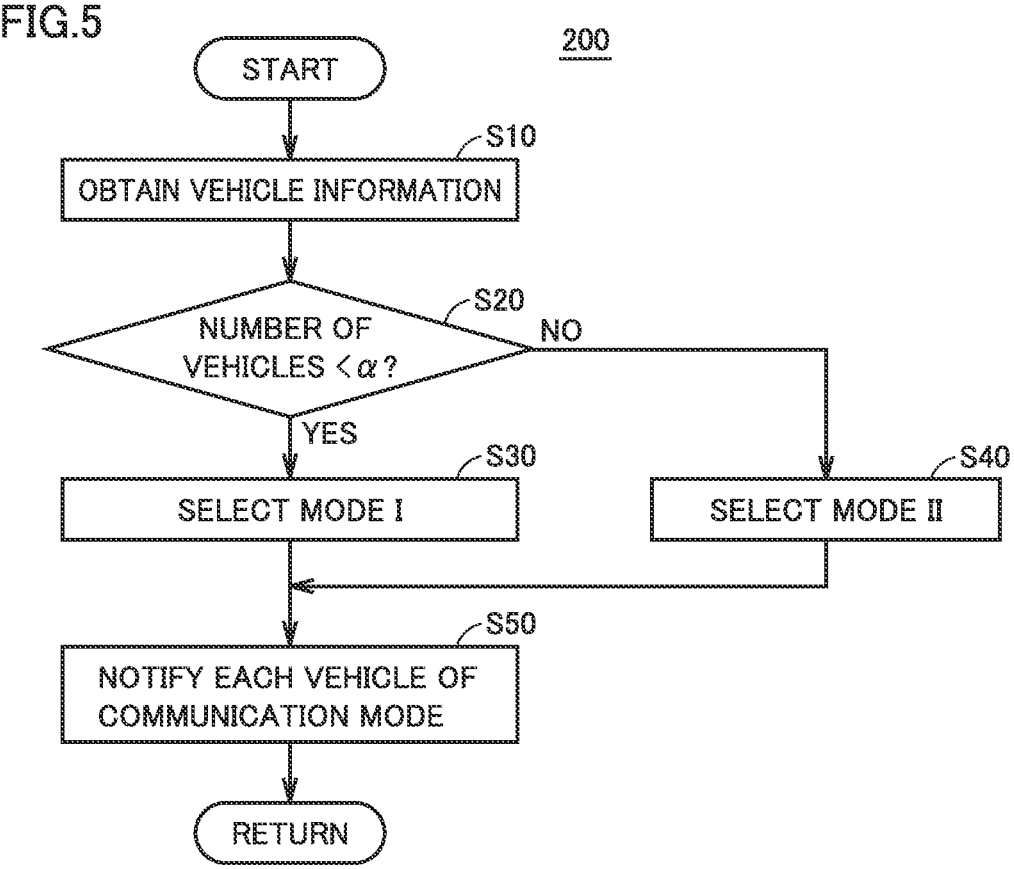
FIG. 5 is a flowchart for illustrating communication mode switching control executed in the server.

FIG. 5 is a flowchart for illustrating communication mode switching control executed in server 200. The flowcharts shown in FIG. 5 and below-described FIGS. 10 to 12 and 14 are implemented by invoking a program stored in controller 130 of vehicle 100 or control unit 210 of server 200 from a main routine and executing the program when a prescribed cycle or a prescribed condition is satisfied. Alternatively, the processing in a part or all of the steps of the flowcharts can be implemented by dedicated hardware (electronic circuit).

Referring to FIG. 5, in step (hereinafter abbreviated as "S") 10, server 200 obtains vehicle information from vehicles 100 located in a target region, and recognizes the number of vehicles 100 to be controlled based on the obtained vehicle information. Then, in S20, server 200 determines whether or not the number of vehicles in the region is smaller than the reference number $\alpha$. The reference number $\alpha$ herein is determined in accordance with a communication load that can be handled by server 200.

When the number of vehicles 100 is smaller than the reference number $\alpha$ (YES in S20), the process proceeds to S30 and server 200 selects mode I as a communication mode. On the other hand, when the number of vehicles 100 is larger than the reference number $\alpha$ (NO in S20), the process proceeds to S40 and server 200 selects mode II as a communication mode.

Thereafter, in S50, server 200 notifies each vehicle 100 of the selected communication mode.

In the flowchart in FIG. 5, the communication mode is selected using the number of all vehicles included in the entire region covered by server 200. Instead of this, the communication mode may be selected in accordance with the number of vehicles actually executing the environment improvement operation by operating environment improvement devices 120.

(Description of Mode I)

Next, details of control in each communication mode will be described. First, mode I will be described.

FIG. 6 shows one example of contents of the vehicle information transmitted from vehicle 100 to server 200. The vehicle information transmitted from each vehicle includes a vehicle ID for identifying the vehicle itself, a date of transmission, position information of the vehicle, the concentration of the environmental pollutant detected by sensor unit 110, a time period during which the environment improvement operation can be executed (available time period), and information about possibility of movement in accordance with the command from server 200 (movement possible information).

As to a coordinate indicated by the position information (X, Y, Z) of the vehicle in FIG. 6, X represents a longitude, Y represents a latitude, and Z represents an altitude, for example. Information about a travel direction (orientation) of the vehicle may be further included as the position information of the vehicle.

The available time period is a parameter that can be arbitrarily set by the user via input unit 170. The user sets a time period for which use of the vehicle is permitted for the environment improvement operation during a time period for which the vehicle is not used. Server 200 refers to the available time period and selects a vehicle used for the environment improvement operation. The environment improvement operation is executed within the range of the available time period set by the user, which makes it possible to contribute to environment improvement while satisfying the user's needs.

The movement possible information is information indicating whether or not the vehicle can be moved to a specified area when the vehicle is used for the environment improvement operation. For example, when the target vehicle is placed in a home garage and a door of the garage is closed (locked), the vehicle cannot be moved from the garage to a specified location, although the environment improvement device can be used in the garage. Server 200 refers to the movement possible information and selects the target vehicle.

When server 200 obtains the vehicle information shown in FIG. 6 from vehicles 100, server 200 calculates the pollution level for each specified area on the map, using the position information of the vehicles and the information about the concentration of the environmental pollutant. For example, server 200 can use a maximum value of the concentrations of the environmental pollutant transmitted from vehicles 100 located in the same area, as the pollution level in the area. Alternatively, server 200 may use an average value of the concentrations of the environmental pollutant in the area as the pollution level.

Figure 7:
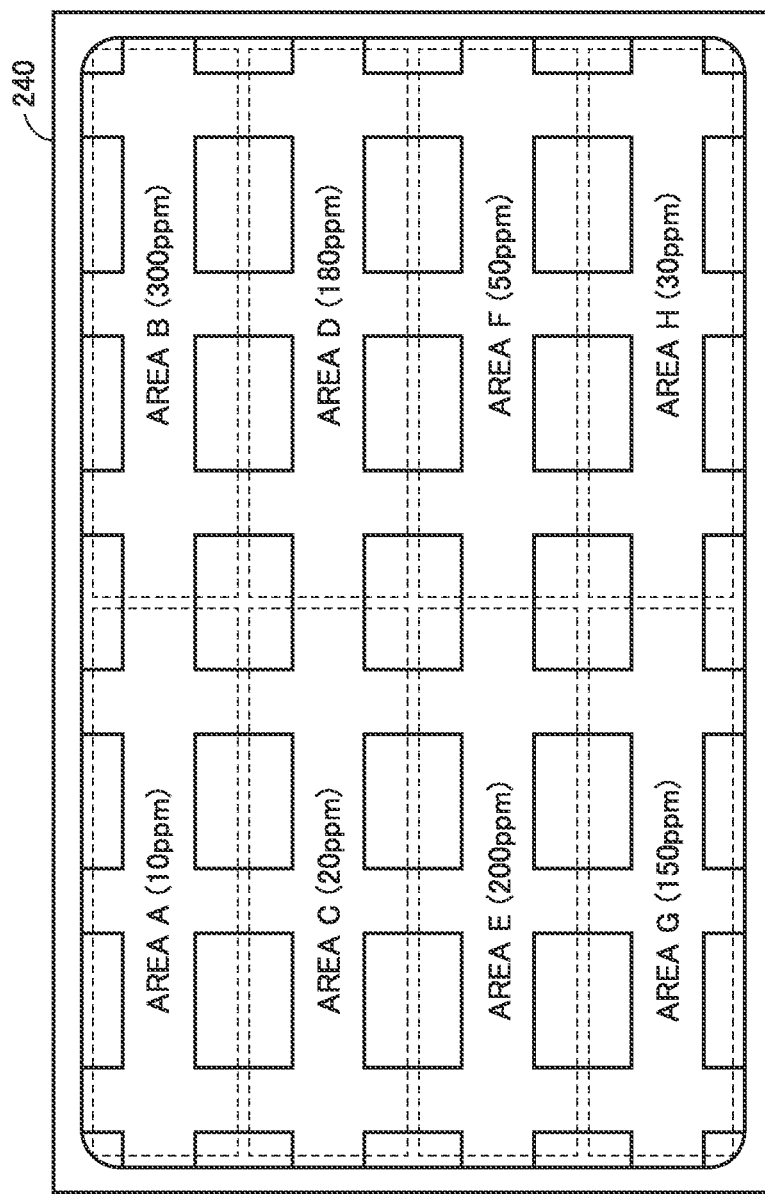
FIG. 7 shows one example of a map indicating a pollution level for each area created in the server.

Based on the calculated pollution level, server 200 creates a map of the pollution level shown in FIG. 7 and displays the map on display 240 of server 200. In the example in FIG. 7, a region displayed on display 240 is divided into eight rectangular areas, i.e., area A to area H, and the pollution level is displayed for each area. Area setting is not limited to the rectangular areas shown in FIG. 7, and may be, for example, administrative sections such as cities, or may be sections determined by main roads.

Based on whether or not the calculated pollution level exceeds a predetermined threshold value for each area, server 200 determines necessity of environment improvement in the area. FIG. 8 shows one example of determination of the necessity of environment improvement, and vehicle selection that are executed by server 200. In the example in FIG. 8, a threshold value of the pollution level for determining the necessity of environment improvement is, for example, 100 ppm, and it is determined that environment improvement is necessary in areas B, D, E, and G where their pollution levels exceed the threshold value. From vehicles 100 located in the region, server 200 selects vehicles executing the environment improvement operation in each area. Server 200 determines vehicles 100 to be selected, in consideration of the type of the environmental pollutant that should be removed and the type of environmental pollutant that can be removed by the environment improvement device mounted on each vehicle 100. In addition, the available time period varies from vehicle 100 to vehicle 100, and thus, when a part of the initially selected vehicles becomes unavailable, server 200 further selects another vehicle located in the target area or in an area close thereto, instead of the unavailable vehicle.

When the area where environment improvement is executed and vehicles 100 used therefor are determined, server 200 generates a control command shown in FIG. 9 and outputs the control command to each vehicle 100. More specifically, server 200 transmits information about the area where environment improvement is executed, initial movement position information, and information about an operation manner in the area to each selected vehicle 100. The initial movement position information is information indicating a position where the vehicle is initially arranged. Each vehicle 100 moves to the position indicated by the initial movement position information from server 200 by automated driving, and then, executes the environment improvement operation based on the area information and the information about the operation manner.

In FIG. 9, when the operation manner is "stop", vehicle 100 moves to the initial movement position, and then, operates environment improvement device 120, with vehicle 100 being at a stop at that position. On the other hand, when the operation manner is "travel", vehicle 100 moves to the initial movement position, and then, travels autonomously in the specified area while operating environment improvement device 120. For example, in a location having a particularly high concentration of the environmental pollutant in the area, the environment improvement operation may be executed, with a particular vehicle being at a stop. The operation manner is preferably changed in accordance with the distribution of the state of pollution (concentration) by the environmental pollutant.

During execution of the environment improvement operation, each selected vehicle 100 transmits the vehicle information shown in FIG. 6 to server 200 at prescribed time intervals. Server 200 monitors a change in pollution level caused by execution of the environment improvement operation, and repeatedly executes the above-described operation. Then, when the pollution level in the specified area is improved and falls below the threshold value, server 200 outputs a command to stop environment improvement device 120 to each vehicle 100 that is executing the environment improvement operation in the area.

FIGS. 10 and 11 are flowcharts for illustrating details of control executed in vehicle 100 and server 200 in mode I. The flowcharts shown in FIGS. 10 and 11 are implemented by invoking programs stored in controller 130 of vehicle 100 and control unit 210 of server 200 from a main routine and executing the programs when a prescribed cycle or a prescribed condition is satisfied. Alternatively, the processing in a part or all of the steps of the flowcharts can be implemented by dedicated hardware (electronic circuit).

Referring to FIG. 10, in S100, vehicle 100 obtains pollution data including the concentration of the environmental pollutant at the current position of vehicle 100, using sensor unit 110. Then, in S110, in addition to the pollution data obtained in S100, vehicle 100 transmits the vehicle information including the other information shown in FIG. 6 to server 200. When a plurality of types of environmental pollutants are detected, individual concentration data of each environmental pollutant may be included.

When vehicle 100 receives the command shown in FIG. 9 from server 200, vehicle 100 determines in S120 whether or not vehicle 100 itself has been selected as a target vehicle for executing the environment improvement operation. When vehicle 100 has not been selected as the target vehicle (NO in S120), vehicle 100 skips the following steps and returns the process to the main routine.

On the other hand, when vehicle 100 has been selected as the target vehicle (YES in S120), the process proceeds to S130 and vehicle 100 moves to the specified area by automated driving in accordance with the movement command transmitted from server 200. When vehicle 100 is, for example, a vehicle owned by a business operator specializing in environment improvement, automated driving is not necessarily required, and a driver of the business operator may drive vehicle 100 to the specified area in a manned manner in accordance with the command from server 200. Although not shown in FIG. 10, when vehicle 100 is selected as the target vehicle by server 200, vehicle 100 notifies the user that vehicle 100 has been selected as the target vehicle, using an email or the like.

When movement to the initial movement position specified by server 200 is completed, vehicle 100 transmits movement completion information to server 200 in S140. When vehicle 100 receives the command to operate environment improvement device 120 from server 200 in response (YES in S150), vehicle 100 operates environment improvement device 120, and maintains the state of being at a stop at the position or travels in the area in accordance with the specified operation manner (S160). When vehicle 100 does not receive the command to operate environment improvement device 120 from server 200 (NO in S150), vehicle 100 moves the process to S170, with environment improvement device 120 being at a stop.

In S170, vehicle 100 determines whether or not the command to stop environment improvement device 120 has been received from server 200. When the stop command has been received from server 200 with environment improvement device 120 being in operation (YES in S170), vehicle 100 stops environment improvement device 120 (S180) and returns the process to the main routine. On the other hand, when the stop command has not been received from server 200 with environment improvement device 120 being in operation (NO in S170), vehicle 100 maintains the operation of environment improvement device 120 and returns the process to the main routine. When environment improvement device 120 is still at a stop, the stop state of environment improvement device 120 is maintained regardless of reception of the stop command.

The foregoing description of S150 is about the initial state with environment improvement device 120 being at a stop. However, when the process in FIG. 10 is started with environment improvement device 120 being in operation, the operation of environment improvement device 120 is maintained regardless of whether determination in S150 is YES or NO.

Next, the process in server 200 will be described with reference to FIG. 11. When server 200 obtains the vehicle information from each vehicle 100 in S200, server 200 calculates the pollution level for each specified area, using the information about the concentration of the environmental pollutant included in the vehicle information from the vehicles located in the area (S210), and creates a pollution map of the entire region including the area (S220). The processing in S230 and the subsequent steps (processing in a broken line box SA in FIG. 11) is executed for each specified area.

In S230, server 200 determines whether or not the pollution level in the specified area exceeds the predetermined threshold value. When the pollution level is equal to or lower than the threshold value (NO in S230), server 200 determines that the environment improvement operation is unnecessary, and moves the process to S280. In S280, when each environment improvement device 120 is at a stop, the stop state is maintained. When each environment improvement device 120 is in operation, each environment improvement device 120 is stopped and the process is returned to the main routine.

On the other hand, when the pollution level is higher than the threshold value (YES in S230), server 200 determines that the environment improvement operation is necessary. Next, in S240, server 200 selects execution vehicles executing the environment improvement operation in the area, based on the position information of each vehicle 100, the information about the available time period and the like obtained as the vehicle information, and transmits the selection information to the vehicles in the area. In S250, server 200 outputs the movement command to selected vehicles 100. Transmission of the selection information of the execution vehicles and transmission of the movement command to vehicles 100 may be performed at different timings as shown in FIG. 11. Alternatively, however, the selection information and the movement command may be included in the same command and transmitted at the same timing.

Then, in S260, server 200 determines whether or not all of the vehicles selected for the specified area have moved to the respectively-set initial movement positions. When server 200 does not receive the movement completion information from each vehicle 100 (NO in S260), the process is returned to S260 and server 200 awaits for completion of movement of the execution vehicles.

On the other hand, when server 200 receives the movement completion information from each vehicle 100 and recognizes that movement of each vehicle to the set initial movement position has been completed (YES in S260), server 200 outputs the operation command to actuate environment improvement device 120 to each execution vehicle in S270, thereby causing each vehicle 100 to execute the environment improvement operation. Then, the process is returned to the main routine.

As described above, the processing in broken line box SA in FIG. 11 is executed for each area, and the environment improvement operation using vehicles 100 is continued until the pollution level in each area becomes equal to or lower than the prescribed threshold value. As a result, it is possible to reduce the environmental pollutant in the specified area and execute environment improvement using vehicles 100 including environment improvement devices 120.

(Description of Mode II)

When mode II is selected as a communication mode, contents of control vary depending on whether or not the vehicle itself is a representative vehicle. The vehicle selected as a representative vehicle receives a control command including a command for the other vehicles in the area from server 200, and transmits the command to each of the other vehicles by using vehicle-to-vehicle communication. In addition, the representative vehicle collects data shared among the vehicles in the area, and transmits the data to server 200.

FIG. 12 shows one example of the control command transmitted to the representative vehicle by server 200. Although the control command in FIG. 12 is similar to the control command in mode I shown in FIG. 9, the former is different from the latter in that the control command in FIG. 12 is a command for each area to which the destination representative vehicle belongs, and a command as to whether or not the vehicle itself is a representative vehicle is added. For example, in the example in FIG. 12, four vehicles are selected as target vehicles for executing the environment improvement operation in area A, and a vehicle having the vehicle ID of "A1234", of the four vehicles, is selected as a representative vehicle. The control command is transmitted from server 200 to the vehicle having the vehicle ID of "A1234". The vehicle having vehicle ID of "A1234" and having received the control command from server 200 recognizes that the vehicle itself is a representative vehicle, and transmits the control command to the other three vehicles (vehicle IDs "D5123", "F8546" and "G5564") by using vehicle-to-vehicle communication. Similarly to the description of mode I, the representative vehicle and the other three vehicles move to the initial movement positions included in the control command, and then, execute the environment improvement operation in accordance with the operation manner.

In mode II, the data (such as, for example, the position information of each vehicle and the detected concentration of the environmental pollutant) owned by each vehicle is shared among the vehicles by vehicle-to-vehicle communication. The representative vehicle aggregates information about each vehicle in the area, and periodically transmits the information to server 200 as area information. By using blockchain authentication for data sharing among the vehicles, the reliability and robustness of the data can be maintained.

Since the available time period is set for each vehicle, the available time period may be exceeded during execution of the environment improvement operation. In such a case, information about the unavailable vehicle is transmitted from the representative vehicle to server 200, and in response, server 200 again selects a vehicle executing the environment improvement operation, based on the state of environmental pollution at this point in time. When the execution vehicle is added and/or changed, a new control command is provided from server 200 to the representative vehicle. When the representative vehicle is changed, server 200 selects another vehicle as a representative vehicle, and transmits the control command to the newly selected representative vehicle.

FIG. 13 is a flowchart for illustrating the detailed process of control executed in server 200 and vehicles 100 in mode II.

First, control of server 200 will be described. When each vehicle 100 is notified from server 200 that mode II has been selected as a communication mode in accordance with the control shown in FIG. 5, the vehicle information is transmitted from each vehicle in the region covered by server 200 to server 200 (S400 and S500). At this point in time, it is not yet determined which vehicle is to be selected as a target vehicle for executing the environment improvement operation and which vehicle is to be selected as a representative vehicle.

When server 200 obtains the vehicle information from each vehicle 100 in S300, server 200 calculates the pollution level in each area based on the concentration of the environmental pollutant included in the vehicle information (S310), and creates the map shown in FIG. 7 (S320). Then, in S330, server 200 selects a target area where the environment improvement operation is executed, by comparing the calculated pollution level and the threshold value. In S340, server 200 selects execution vehicles executing the environment improvement operation in the target area. In S340, together with selection of the execution vehicles, a representative vehicle is selected from the execution vehicles. Then, in S350, server 200 transmits the control command shown in FIG. 12 to the selected representative vehicle.

When the environment improvement operation is started in each area, server 200 periodically obtains, from the representative vehicle in each area, the area information including the position information of each vehicle in the area and the information about a change in concentration of the environmental pollutant (S360). Then, in S370, server 200 determines whether or not the pollution level in the target area has been improved to be equal to or lower than the prescribed threshold value, based on the area information.

When the pollution level has been improved (YES in S370), the process proceeds to S380 and server 200 transmits, to the representative vehicle, the command to stop the environment improvement operation for the target area. On the other hand, when the pollution level has not yet been improved (NO in S370), the process is returned to S360 and server 200 continues the environment improvement operation in the target area. Although not shown in FIG. 13, when the execution vehicles needs to be changed in the target area during execution of the environment improvement operation, server 200 again executes selection of a vehicle executing the environment improvement operation as needed, and outputs a changed control command to each vehicle via the representative vehicle. In server 200, such control is executed for each target area.

Next, control of the vehicle selected as a representative vehicle will be described. As described above, upon receiving the notification that mode II has been selected as a communication mode from server 200, each vehicle 100 first transmits its own vehicle information to server 200 (S400). When the environment improvement operation and the representative vehicle is selected by server 200 and the control command (FIG. 12) is received from server 200 (S410), the vehicle having received the control command recognizes that the vehicle itself is selected as the representative vehicle. Then, in S420, the representative vehicle broadcasts the control command transmitted from server 200 to the other vehicles by using vehicle-to-vehicle communication. Transmission of the control command from the representative vehicle to the other vehicles may be implemented by one-to-one communication (P2P communication).

Then, in accordance with the command for the vehicle itself included in the control command, the representative vehicle moves to the initial movement position in the target area (S430), and operates environment improvement device 120 to start the environment improvement operation (S440). During execution of the environment improvement operation, the representative vehicle shares the data of the vehicles in the area by using vehicle-to-vehicle communication (S450). At this time, the representative vehicle edits the data of the vehicles as appropriate to generate area information, and transmits the area information to server 200 at prescribed time intervals. The area information also includes information about whether or not a change of the execution vehicles is necessary.

As described above, server 200 monitors a status of improvement of the pollution level in the target area based on the area information, and determines whether or not to continue the environment improvement operation. In S470, the representative vehicle determines whether or not the command to stop the environment improvement operation has been received from server 200. When the stop command has not been received (NO in S470), the process is returned to S450 and the environment improvement operation is continued. On the other hand, when the stop command has been received (YES in S470), the process proceeds to S480, and the representative vehicle stops its own environment improvement device 120 and transmits the command to stop the environment improvement operation to the other vehicles in the target area by using vehicle-to-vehicle communication.

Next, control of the vehicles other than the representative vehicle will be described. When each vehicle 100 receives the notification that mode II has been selected as a communication mode from server 200, each vehicle 100 first transmits its own vehicle information to server 200 (S500). Then, when vehicle 100 receives the control command from the representative vehicle using vehicle-to-vehicle communication (S510), vehicle 100 recognizes that vehicle 100 itself has been selected as a vehicle executing the environment improvement operation. Then, in accordance with the control command, vehicle 100 moves to the initial movement position in the target area (S520), and operates environment improvement device 120 to start the environment improvement operation (S530).

During execution of the environment improvement operation, vehicle 100 shares the data of each vehicle in the area by using vehicle-to-vehicle communication (S540). Then, in S550, vehicle 100 determines whether or not the command to stop the environment improvement operation has been received from the representative vehicle. When the stop command has not been received (NO in S550), the process is returned to S540 and the environment improvement operation is continued. On the other hand, when the stop command has been received (YES in S550), the process proceeds to S560 and vehicle 100 stops its own environment improvement device 120 and stops the environment improvement operation.

As described above, when the number of vehicles communicating with the server is large and individual communication between the server and each vehicle increases the load on the server, the communication mode of "mode II" is used in which communication is distributed using the representative vehicle and the data is shared among the vehicles by vehicle-to-vehicle communication. As a result, the communication load between the server and the vehicles can be reduced and appropriate communication can be performed.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle information communication system comprising:
    a plurality of vehicles; and
    a server configured to communicate with the plurality of vehicles by using either a first communication mode or a second communication mode, wherein
    the first communication mode being a communication mode in which the server receives and transmits information to and from each of the plurality of vehicles individually,
    the second communication mode being a communication mode in which the server receives and transmits the information to and from a part of the plurality of vehicles and the information is shared among the plurality of vehicles by using vehicle-to-vehicle communication, and
    the server further configured to
        output a command to execute, based on determining an available time period, one or more operations; and
        perform communication in the first communication mode when a communication load between the server and the plurality of vehicles is lower than a threshold value, and perform communication in the second communication mode when the communication load is higher than the threshold value.

2. The vehicle information communication system according to claim 1, wherein in the second communication mode, the plurality of vehicles share the information by using blockchain authentication.

3. An environment improvement system comprising:
    a sensor configured to detect a state of pollution by an environmental pollutant;
    a plurality of vehicles; and
    a server configured to communicate with the plurality of vehicles by using either a first communication mode or a second communication mode, wherein
    the first communication mode being a communication mode in which the server receives and transmits information to and from each of the plurality of vehicles individually,
    the second communication mode being a communication mode in which the server receives and transmits the information to and from a part of the plurality of vehicles and the information is shared among the plurality of vehicles by using vehicle-to-vehicle communication,
    when a pollution level by the environmental pollutant exceeds a reference value in an area where the sensor is located, the server being configured to select at least one of the plurality of vehicles and cause the at least one selected vehicle to move to the area, and configured to output a command to execute, based on determining an available time period, an environment improvement operation, and
    the server being configured to perform communication in the first communication mode when a communication load between the server and the plurality of vehicles is lower than a threshold value, and perform communication in the second communication mode when the communication load is higher than the threshold value.

4. The environment improvement system according to claim 3, wherein the server is configured to perform communication in the first communication mode when the number of vehicles selected to execute the environment improvement operation is smaller than a reference number, and perform communication in the second communication mode when the number is larger than the reference number.

5. The environment improvement system according to claim 3, wherein the sensor is provided in each of the plurality of vehicles.

6. The environment improvement system according to claim 5, wherein the server is configured to calculate the pollution level for each predetermined area, using position information of the plurality of vehicles and information about the state of pollution detected by the sensor.

7. The environment improvement system according to claim 6, wherein
    when the server performs communication in the second communication mode, the server is configured to determine, for each predetermined area, a representative vehicle for communicating with the server, and
    during communication in the second communication mode, the representative vehicle transmits the information from the server to the other vehicles in the predetermined area by vehicle-to-vehicle communication, and transmits the information shared among the vehicles in the predetermined area to the server.

8. A server configured to communicate with a plurality of vehicles,
    the server being configured to communicate with the plurality of vehicles by using either a first communication mode or a second communication mode,
    the first communication mode being a communication mode in which the server receives and transmits information to and from each of the plurality of vehicles individually,
    the second communication mode being a communication mode in which the server receives and transmits the information to and from a part of the plurality of vehicles and the information is shared among the plurality of vehicles by using vehicle-to-vehicle communication, and
    the server further configured to
        output a command to execute, based on determining an available time period, one or more operations; and
        perform communication in the first communication mode when a communication load between the server and the plurality of vehicles is lower than a threshold value, and perform communication in the second communication mode when the communication load is higher than the threshold value.

* * * * *